US011639872B1

(12) United States Patent
Spalding (10) Patent No.: US 11,639,872 B1
(45) Date of Patent: May 2, 2023

(54) COMBUSTION MONITORING SYSTEM (71) Applicant: GE Inspection Technologies, LP, Lewistown, PA (US)

(72) Inventor: Michael Charles Spalding, Hudson, OH (US)

(73) Assignee: GE Inspection Technologies, LP, Lewistown, PA (US)

( * ) Notice: Subject to any disclaimer, the term of this patent is extended or adjusted under 35 U.S.C. 154(b) by 335 days.

(21) Appl. No.: 16/839,871

(22) Filed: Apr. 3, 2020

Related U.S. Application Data (60) Provisional application No. 62/840,612, filed on Apr. 30, 2019.

(51) Int. Cl.
*G01J 3/02* (2006.01)
*G01N 21/31* (2006.01)

(52) U.S. Cl.
CPC .......... *G01J 3/0218* (2013.01); *G01N 21/314* (2013.01)

(58) Field of Classification Search
None
See application file for complete search history.

(56) References Cited

U.S. PATENT DOCUMENTS

| | | |
|---|---|---|
| 5,051,595 A | 9/1991 | Kern et al. |
| 6,071,114 A | 6/2000 | Cusack et al. |
| 6,678,055 B2 * | 1/2004 | Du-Nour ................ G01B 11/16 356/504 |
| 9,989,385 B2 | 6/2018 | Harpin et al. |
| 2004/0057645 A1 | 3/2004 | Willner |
| 2006/0059917 A1 * | 3/2006 | Plimpton .................. G01J 5/08 60/803 |
| 2013/0100439 A1 | 4/2013 | Yu et al. |
| 2014/0202253 A1 * | 7/2014 | Harpin ............... G01K 11/3206 374/161 |
| 2014/0318273 A1 | 10/2014 | Dong et al. |
| 2016/0231231 A1 * | 8/2016 | Chan ........................ G01N 9/00 |
| 2016/0369649 A1 * | 12/2016 | Olechnowicz ........ G01J 5/0014 |
| 2018/0209853 A1 * | 7/2018 | Kraus ................... G01J 5/0014 |

FOREIGN PATENT DOCUMENTS

WO WO-9930006 A2 * 6/1999 ............. F01D 17/02

* cited by examiner

*Primary Examiner* — Rebecca A Volentine
(74) *Attorney, Agent, or Firm* — Mintz Levin Cohn Ferris Glovsky and Popeo, PC (57) ABSTRACT

Systems, methods, and computer readable medium are provided for determining interferometric data and spectral data associated with combustion conditions of a flame in a combustion chamber using a sensor head including a first vacuum cavity, a diaphragm operatively interfaced to an inner portion of the combustion chamber, and an optical sensor interrogator configured on a computing device and coupled to the sensor head via optical fibers. The optical sensor interrogator including an interferometer configured to determine interferometric data associated with the flame based on light transmitted and reflected via a first optical fiber and a spectrometer configured to determine spectral data associated with the flame based on light transmitted via a second optical fiber.

20 Claims, 7 Drawing Sheets

COMBUSTION MONITORING SYSTEM

RELATED APPLICATION

This application claims priority under 35 U.S.C. § 119(e) to U.S. Provisional Application No. 62/840,612, filed Apr. 30, 2019, the entire contents of which are hereby expressly incorporated by reference herein.

BACKGROUND

Interferometric techniques may be used to determine combustion characteristics of a flame in a combustion chamber, such as a combustion chamber of a gas turbine. To perform these techniques, a fiber optic interferometry sensor may be configured to transmit light into the sensor and to receive light reflected from the sensor. An interferometer coupled to the fiber optic interferometry sensor may process interference patterns associated with the reflected light to determine differences in optical path lengths that are reflected from different reflective boundaries within the sensor. The interference pattern differences can be used to determine a number of combustion measurements such as dynamic pressure, static pressure, and temperature associated with the combustion reaction occurring in the combustion chamber. Measuring and monitoring combustion characteristics can be desirable to ensure optimal and safe operation of reciprocating engines, such as internal combustion engines, in addition to turbomachinery such as gas turbines.

Spectrometric techniques may be used to determine an intensity of light as a function of wavelength or frequency and may measure ultraviolet, visible, and infrared radiation emitted by a combustion reaction. These spectral measurements may be used to characterize a flame or combustion reaction, as well as the operation of the equipment in which the flame or combustion reaction is occurring. Spectrometric techniques may be performed using spectral sensing components which may be configured independently from interferometric sensing systems measuring combustion characteristics of the same combustion reaction.

SUMMARY

Combustion monitoring may be performed in relation to equipment in which a combustion reaction is present, such as a gas turbine in an oil and gas production environment. A combustion reaction may include a flame, a fuel source, and an oxygen supply such that the fuel source is ignited, creating a flame which persists in the presence of oxygen. Monitoring the condition, quality, and presence of the combustion reaction may provide insight about the conditions of the equipment generating the combustion reaction, the fuel supply, or the oxygen supply.

Combustion monitoring systems may include a fiber optic interferometry sensor positioned with respect to a combustion source and coupled to an interferometer via an optical fiber. By measuring the interferometric data associated with the light that is reflected through the sensor head, characteristics of the combustion reaction, such as the dynamic pressure, static pressure, and temperature, can be determined. As an example, a sensor head can be interfaced to a combustion reaction and can transmit changes in reflected light that are associated with characteristics of the combustion reaction via an optical fiber to a computing device configured with an interferometer.

Traditional fiber optic interferometry sensors used for combustion monitoring can be limited in their ability to determine additional spectral-based combustion characteristics. In one aspect, interferometric combustion monitoring systems can be unable to generate measurements associated with spectral data, such as flame quality and fuel contamination. In another aspect, use of interferometric sensors can be limited under high temperature conditions, such as combustion chambers with operating conditions at or above about 1000 degrees Celsius. Additional combustion characteristics can be determined using other sensor types, but may require additional penetration points or observation locations into the interior volume of the combustion chamber to perform the combustion monitoring. Deploying multiple sensor types at numerous locations in a combustion chamber requires multiple penetrations through the combustion chamber liner and casing, which can weaken the wall, casing, and liner at the penetration site. In addition, a configuration of multiple penetration sites for different sensors is more expensive to manufacture, maintain and configure as compared to performing combustion monitoring with a sensor configured for penetrating the combustion chamber liner and casing at a single location.

In general, improved systems, devices, and methods are provided herein for performing combustion monitoring using spectral data analysis. A fiber optic interferometry sensor may be configured to include spectral sensing components. The spectral sensing components may include a spectrometer and additional optical fibers to transmit light from the combustion chamber to the spectrometer for use in determining additional combustion characteristics which cannot be determined using interferometric sensing components alone. Additional combustion characteristics that may be determined using the spectral data may include flame temperature, flame supervision, igniter supervision, flame quality, and the presence of contaminants in the fuel source and combustion reaction, or the like. The improved combustion monitoring system may provide further benefits of integrating interferometric sensing components and spectral sensing components into a single sensor head, thereby requiring a single penetration point into a combustion chamber to monitor and collect both interferometric and spectral data associated with the combustion reaction.

In an aspect, a system is provided to perform combustion monitoring using spectral data. The system can include a computing device, including a data processor and a sensor head assembly. The sensor head assembly can include a sensor head affixed to a turbine engine combustion chamber. The sensor head can include a first sized vacuum cavity located in a first position within the sensor head and a diaphragm. The diaphragm can include a first surface positioned opposite the vacuum cavity and a second surface operatively interfaced to an inner portion of the combustion chamber. The sensor head can be configured to measure combustion conditions of a flame in the combustion chamber based on light transmitted via optical fibers. The system can also include an optical sensor interrogator configured on the computing device and coupled to the sensor head via a plurality of optical fibers. The optical sensor interrogator can include an interferometer coupled to the sensor head and configured to determine interferometric data associated with a flame based on light transmitted to and reflected from the sensor head via a first optical fiber. The optical sensor interrogator can also include a first spectrometer coupled to the sensor head and configured to determine spectral data associated with the flame based on light transmitted from the flame and into the sensor head prior to transmission to the spectrometer via a second optical fiber.

One or more of the following features can be combined within the system in any feasible combination. For example, the optical sensor interrogator can be coupled to the sensor head via a single optical fiber, and can further include an optical switch coupled to the interferometer and to the first spectrometer. The computing device can be configured to execute instructions causing the data processor to determine the interferometric data and/or the spectral data based on a pre-determined start time, a pre-determined event, or a pre-determined interval of time since the instructions were previously executed. The sensor head can be affixed to the combustion chamber at a single penetration point. The sensor head can be formed of sapphire or aluminum oxide. At least on optical fiber for the plurality of optical fibers can include a single strand optical fiber or a multi-strand optical fiber. The optical sensor interrogator can include a second spectrometer coupled to the sensor head via a third optical fiber. The first optical fiber can be configured within the sensor head in a horizontal orientation relative the second optical fiber. The first optical fiber can be configured within the sensor head in a vertical orientation relative the second optical fiber. The first optical fiber can be configured centrally within the sensor head and a plurality of second optical fibers can be configured radially within the sensor head relative to the centrally configured first optical fiber.

In another aspect, a method is provided. The method can include transmitting light to a sensor head via a first optical fiber. The sensor head can be affixed to a combustion chamber and can be configured to measure combustion conditions of a flame in the combustion chamber based on the transmitted light. The method can also include receiving light reflected from the sensor head via the first optical fiber. The method can further include determining interferometric data based on the reflected light received via the first optical fiber. The method can also include providing the interferometric data.

One or more of the following features can be combined in any feasible combination. For example, the method can further include determining a dynamic pressure and/or a static pressure of a combustion reaction occurring within the combustion chamber based on the determined interferometric data. Determining the interferometric data can further includes determining a sensor head temperature based on the determined interferometric data. The method can also include receiving light transmitted from the sensor head via a second optical fiber. The method can further include determining spectral data based on the light transmitted from the second optical fiber. The method can also include providing the spectral data. The sensor head can be affixed to the combustion chamber at a single penetration point. The sensor head can be formed of sapphire or aluminum oxide. The method can further include determining one or more of a flame temperature, a flame quality, a presence of a contaminant, an absence of a contaminant, a measure of flame supervision, a measure of igniter supervision, or any combination thereof, based on the determined spectral data. The contaminant can include chlorine, nickel, vanadium, potassium, sodium, sulfur, and/or a combination thereof. The flame quality can be determined as a ratio of two wavelength ranges.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

BRIEF DESCRIPTION OF THE DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure. Those skilled in the art will understand that the systems, devices, and methods specifically described herein and illustrated in the accompanying drawings are non-limiting exemplary embodiments and that the scope of the present invention is defined solely by the claims.

DETAILED DESCRIPTION

Combustion can refer to the process of burning one or more materials. Combustion monitoring can be performed to determine characteristics of the combustion process, such as temperature, pressure, etc. of a combustion reaction occurring in a combustion chamber. As an example, a combustion chamber can be a component in a gas turbine in which a fuel and air are mixed and burned. Accurately measuring combustion characteristics within the combustion chamber can facilitate condition monitoring of a combustion process, as the measurements can provide insight into the operational state of the gas turbine equipment, as well as the quality of fuel and air are consumed during the combustion reaction. The accuracy of measured combustion characteristics can be reduced when measurements are taken in a variety of locations using multiple, different sensor systems. Multiple penetration sites can increase the complexity and cost of a combustion monitoring system and can weaken structural aspects of the combustion chamber components, including the combustion chamber wall, liner, and/or casing as compared to combustion monitoring system that utilize sensor configurations which can interface to the combustion chamber at a single penetration site. Thus, operators of combustion monitoring systems can seek to gather as much data about the combustion reaction as possible using minimally invasive techniques that do not require large numbers of sensors to be configured and deployed in multiple locations throughout a combustion chamber. For example, by adding spectral sensing components to a fiber optic interferometry sensor, additional combustion characteristics can be determined without requiring additional penetration points in the combustion chamber liner and the combustion chamber casing for the spectral sensors.

To improve the quality and diversity of measured combustion characteristics, an improved combustion monitoring system is provided and can include spectral data analysis components. By employing spectral analysis components in combination with fiber optic interferometric sensors, additional combustion characteristics can be determined without requiring additional, separately positioned sensors and so that a combustion reaction and/or equipment, fuel or oxygen supplied to the combustion chamber may be accurately characterized in regard to desired operating conditions.

Embodiments of systems, devices, and corresponding methods for performing combustion monitoring using spectral data analysis of a combustion reaction occurring in a combustion chamber associated with a gas turbine are disclosed herein. However, embodiments of the disclosure can be employed for monitoring a combustion reaction in other equipment or combustion environments without limit.

Figure 1:
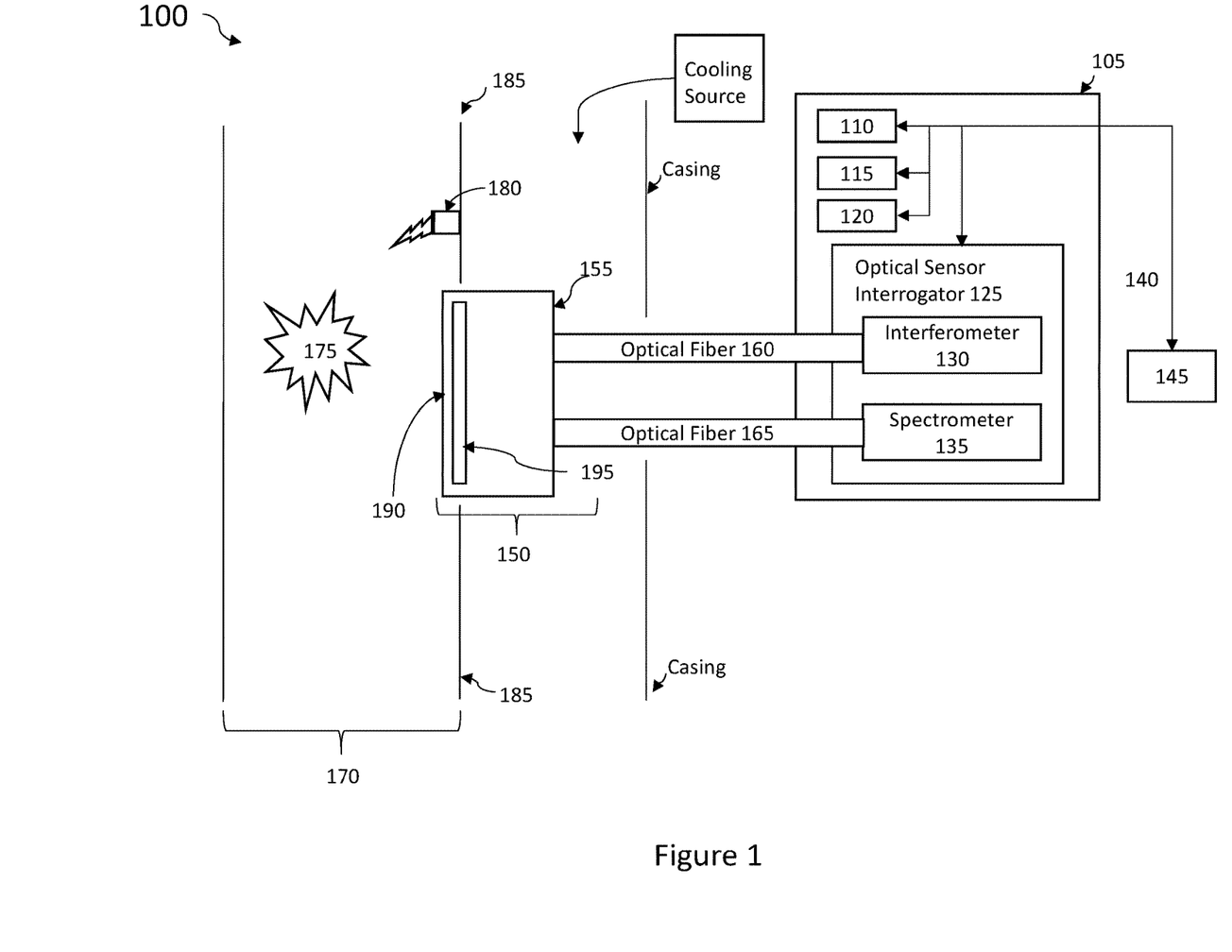
FIG. 1 is a diagram illustrating an exemplary embodiment of a combustion monitoring system configured to perform combustion monitoring using spectral analysis.

FIG. 1 illustrates one exemplary embodiment of a combustion monitoring system 100 configured to perform combustion monitoring using spectral data analysis. The system 100 includes a computing device 105, including a data processor 110, a memory 115, a controller 120, and an optical sensor interrogator 125. The optical sensor interrogator 125 is configured to include an interferometer 130 and a spectrometer 135 and can generate an output 140. The output 140 can be provided to a user via a display 145 coupled to the computing device 105. In some embodiments, the output can be stored in the memory 115. The combustion monitoring system 100 also includes a sensor head assembly 150 including a sensor head 155 coupled to the computing device 105 by a plurality of optical fibers, e.g., optical fibers 160 and 165. The combustion chamber 170 includes a flame 175 generating a combustion reaction and an igniter 180 which may be used to initiate the flame 175. The sensor head 155 is interfaced to the combustion chamber 170 so that a flame 175 or a combustion reaction occurring in a combustion chamber 170 can be sensed by the sensor head 155 through an opening in the combustion chamber liner 185. The sensor head 155 includes a diaphragm 190 and a vacuum cavity 195.

As shown in FIG. 1, a sensor head 155 is interfaced with a flame 170 or combustion reaction in a combustion chamber 170 through a single penetration in the combustion chamber liner 185. The sensor head 155 may include a material that is transparent and suitable for transmitting and receiving ultraviolet, visible, and/or infrared radiation from the combustion chamber 170. For example, the sensor head 155 may be formed from materials such as sapphire or aluminum oxide. As shown in FIG. 1, the sensor head 155 may be positioned between a liner 185 of the combustion chamber and a casing of the combustion chamber such that the casing is located between the liner 185 and the computing device 105. A cooling source may provide a supply of coolant, such as cool air, refrigerated gases, cooling fluids, or the like, to a volume of space that is located between the combustion chamber liner 185 and the combustion chamber casing. The sensor head 155 can be positioned relative to the combustion chamber 170 via a single penetration or opening in the combustion chamber liner 185 and casing. The sensor head 155 can thus be positioned so as to measure characteristics of the combustion reaction as well as the operation of other components in the combustion chamber 170, such as an igniter 180.

As further shown in FIG. 1, the sensor head 155 includes a diaphragm 190 and a vacuum cavity 195. The thickness, shape, and position of the diaphragm 190 may vary. Similarly, the number, shape, and position of the vacuum cavity 195 may also vary. The diaphragm 190 and vacuum cavity 195 may change size and/or shape due to the pressure and temperature fluctuations of the combustion reaction that the sensor head 155 is monitoring. As a result of the changes in size and/or shape, the sensor head 155 may transmit the reflected light differently causing different interference patterns to be received by the interferometer 130. The sensor head 155 is coupled to the computing device 105 by a plurality of optical fibers, e.g., optical fibers 160 and 165. In some embodiments, one or both of the optical fibers 160, 165 may include single strand optical fibers or multi-strand optical fibers. A variety of configurations of optical fibers 160, 165 may be coupled to the sensor head 155 as will be described in more detail in FIGS. 5A-5B.

As shown in FIG. 1, the sensor head 155 is coupled to the computing device 105 via the optical fibers 160, 165. The computing device 105 may include a data processor 110, an input device, a memory 115, a controller 120, a display 145, and a networking or communications interface. The data processor 110 can execute computer readable instructions, stored in the memory 115, configured to perform combustion monitoring using spectral and interferometric data analysis. In some embodiments, the computing device 105 may be configured in a climate controlled control room. The computing device 105 can be configured with an optical sensor interrogator 125, which can include a plurality of optical elements such as an interferometer 130, a spectrometer 135. The optical sensor interrogator 125 can further include a data processor and computer readable instructions which when executed cause the optical sensor interrogator 125 to generate transmitted light to the sensor head 155 and to receive reflected light from the sensor head 155. The interferometer 130, can be a Fabry-Perot interferometer, and can be configured such that interference patterns associated multiple wavelengths of light are used to make precise measurements. For example, in combustion monitoring applications, the interferometer 130 may transmit light via a first optical fiber 160 to one or more reflective interfaces within the sensor head 155, such as an interface of the vacuum cavity 195 or the diaphragm 190. The interferometer 130 can measure the interference pattern associated with the light that is reflected by the interfaces and may further determine a dynamic pressure, a static pressure, or a temperature of the combustion reaction or flame 175 in the combustion chamber 170 based on the interference patterns of the reflected light. In some embodiments, the interferometer 130 may include a Fizeau wedge used to project an interference pattern associated with the reflected light onto a charge-coupled device in order to determine one or more combustion characteristics based on the interferometric data processed by the interferometer 130. The Fizeau wedge is a wavelength distributor that can be used to distribute the reflected light such that each element of the charge-coupled device is associated with a particular wavelength of the reflected light. Additional detail regarding the operation of the interferometer 130 will be described in relation to FIG. 2.

As further shown in FIG. 1, the optical sensor interrogator 125 includes a spectrometer 135. The spectrometer 135 may receive light transmitted from the combustion reaction or flame 175 after it has passed through the transparent sensor head 155 and further passed to the spectrometer 135 via a second optical fiber 165. A spectrometer 135 is an instrument that can be used for recording and measuring light data, or spectra. The spectrometer 135 may be an optical spectrometer capable of separating and measuring spectral components of light and it may show the intensity of light as a function of wavelength or frequency. The optical spectrometer 135 may be configured to measure ultraviolet, visible, and infrared light for use in determining combustion characteristics such as flame temperature, flame quality, and/or the presence and type of fuel contaminants, such as nickel, vanadium, potassium, sodium, sulfur, and combinations thereof, which may exist in a combustion reaction or fuel source. Additional details regarding the operation of the spectrometer 135 will be described in relation to FIG. 3.

Figure 2:
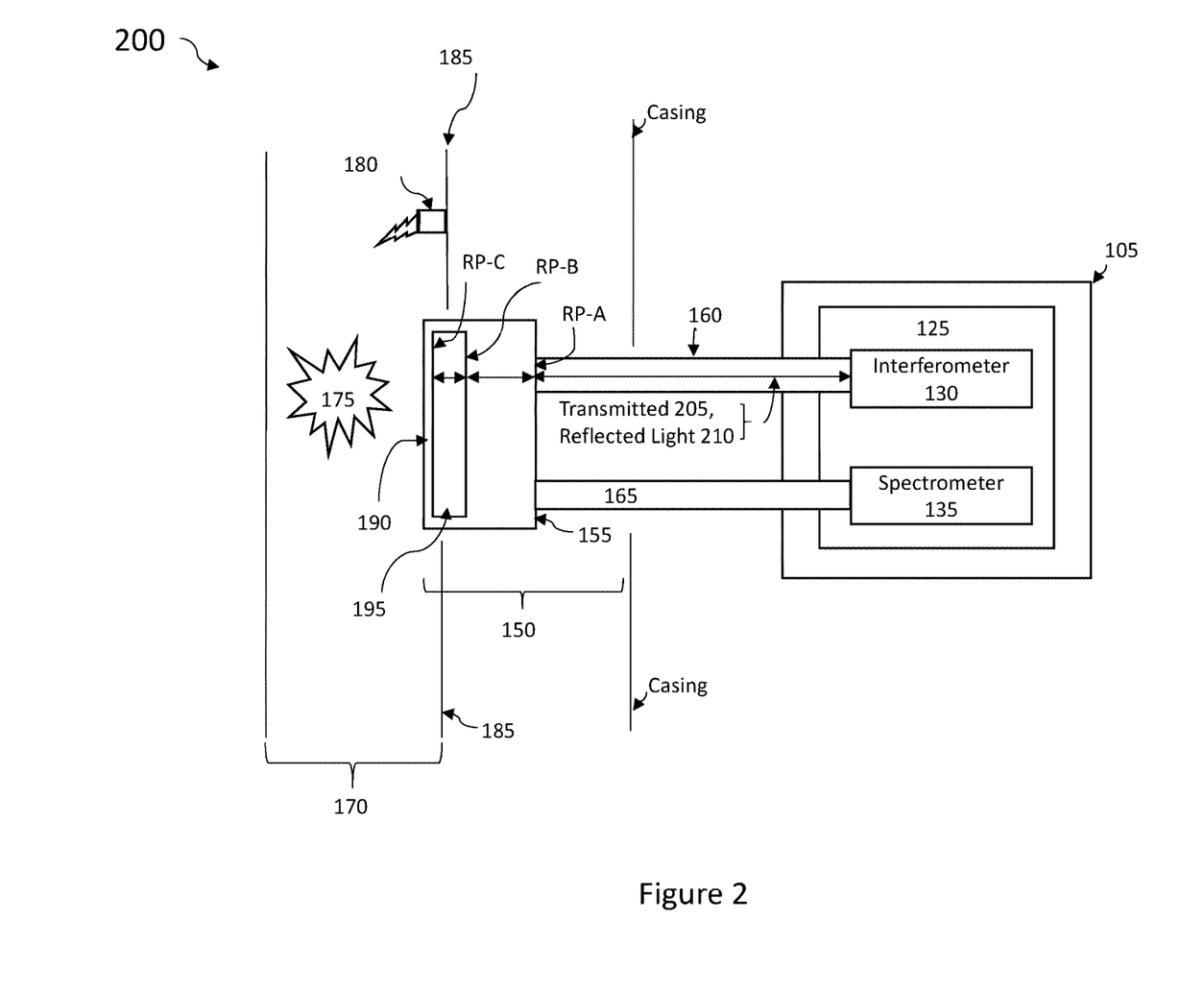
FIG. 2 is a diagram illustrating the combustion monitoring system of FIG. 1 in operation to perform combustion monitoring using spectral analysis.

FIG. 2 is a diagram 200 illustrating an exemplary embodiment of the combustion monitoring system of FIG. 1 in operation to perform combustion monitoring using spectral analysis. The combustion monitoring system shown in FIG. 2 will be used to describe how interferometric data can be measured and used to determine combustion characteristics in more detail.

As shown in FIG. 2, the optical sensor interrogator 125 includes an interferometer 130 coupled to the sensor head 155 via optical fiber 160. The interferometer 130 may be configured to generate and transmit 205 light to the sensor head 155 where it may be reflected 210 back to the interferometer 130 at reflection points within the sensor head 155, such as reflection point A (reference RP-A), reflection point B (reference RP-B), and reflection point C (reference at RP-C). The interferometer 130 may transmit 205 multi-frequency light or white light to the sensor head 155 via optical fiber 160 and the interference patterns of the light reflected 210 from each of reflection points A, B, and/or C may be used to determine combustion characteristics, such as dynamic pressure, static pressure and/or temperature of the combustion reaction occurring in the combustion chamber 170 via interferometric techniques. For example, the diaphragm 190 may be exposed to gases and radiation from the combustion chamber 170. As a result, the diaphragm 190 may deflect or change shape in a manner that corresponds to the pressure outside the sensor head 155. As the diaphragm 190 is displaced, the distance between the diaphragm 190 and RP-B of the vacuum cavity 195 may change. The distance change may result in changes in the interference patterns of the reflected light that is received at the interferometer 130 so that a dynamic pressure and a static pressure of the combustion reaction can be determined based on the changes in the interference patterns. A dynamic pressure may be considered to be the range or magnitude of change of discrete pressure values determined over a period of time. A static pressure may be considered to be pressure measurement associated with a specific point in time and may be used to determine flame supervision.

The sensor head 155 may undergo changes in size as the temperature of the combustion reaction changes. For example, under high heat conditions the thickness of the sensor head 155 may change causing a change in the distance between RP-A and RP-B. The change in the distance may further cause changes in the interference patterns that are received by the interferometer 130. In this way, the interferometer 130 may determine the temperature of the combustion reaction.

Figure 3:
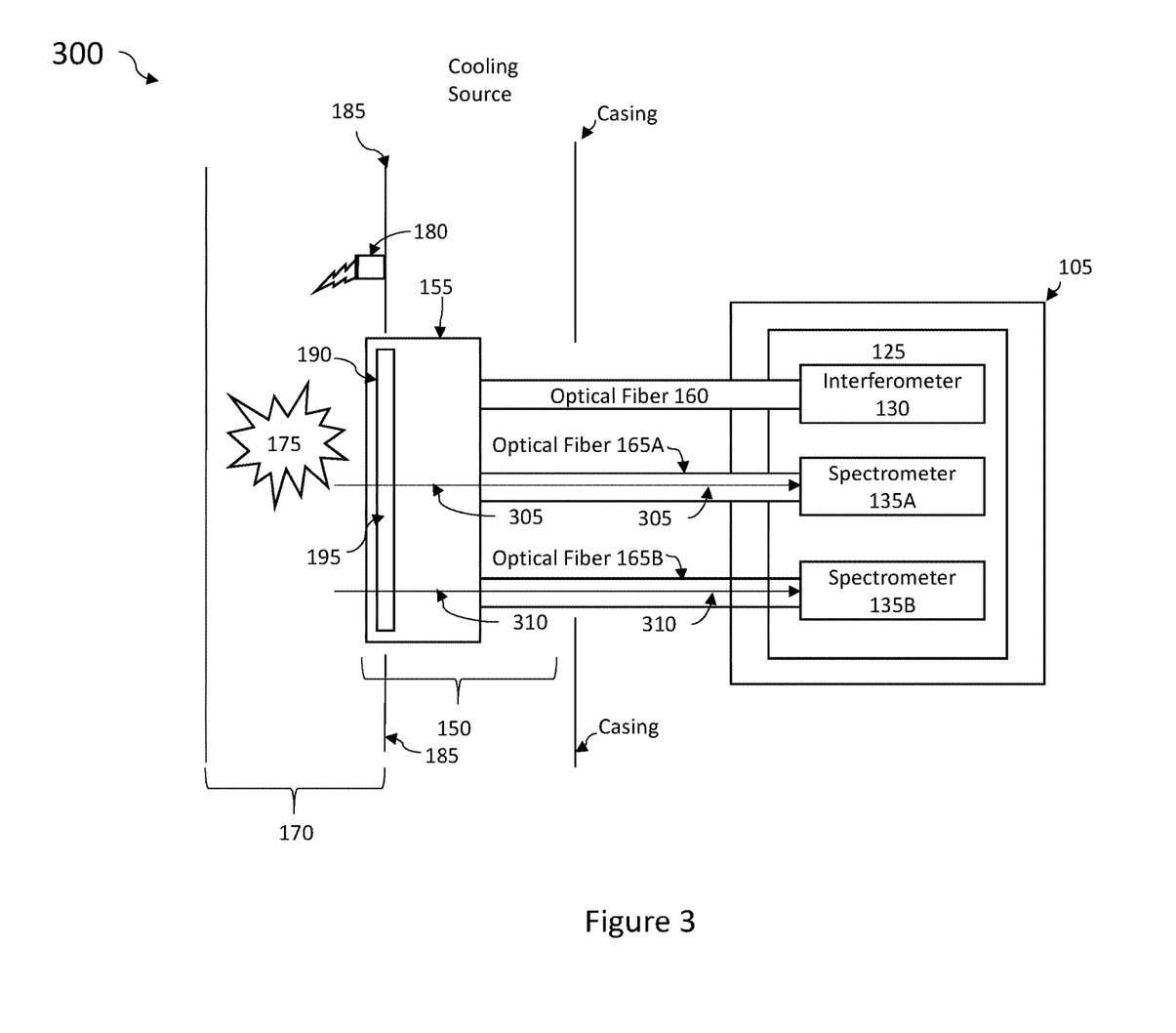
FIG. 3 is a diagram illustrating an exemplary embodiment of a combustion monitoring system configured to perform combustion monitoring using spectral analysis in operation.

FIG. 3 is a diagram 300 illustrating an exemplary embodiment of the combustion monitoring system of FIG. 1 in operation to perform combustion monitoring using spectral analysis. The combustion monitoring system shown in FIG. 3 will be used to describe how spectrometry data can be measured and used to determine combustion characteristics in more detail.

As shown in FIG. 3, the optical sensor interrogator 125 includes a spectrometer 135A coupled to the sensor head 155 via optical fiber 165A. The spectrometer 135A may be configured to receive light 305 emitted from the combustion chamber 170 and transmitted through the sensor head 155. The spectrometer 135A may process the received ultraviolet, visible, and infrared light 305 generated by the combustion reaction or an igniter 180 flame and digitize the spectrum of light using spectral analysis techniques in order to determine combustion characteristics such as flame temperature, flame and igniter supervision, flame quality, and the presence of contaminants in the fuel source or the combustion chamber 170.

As further shown in FIG. 3, the optical sensor interrogator 125 can include an additional spectrometer 135B coupled to the sensor head 155 via a second optical fiber 165B. The spectrometer 135B may be similarly configured as the spectrometer 135A and may receive light 310 emitted from the combustion chamber 170 and transmitted through the sensor head 155. The spectrometer 135B may process the received ultraviolet, visible, and infrared light 310 generated by the combustion reaction or an igniter 180 flame and digitize the spectrum of light using spectral analysis techniques in order to determine combustion characteristics such as flame temperature, flame and igniter supervision, flame quality, and the presence of contaminants in the fuel source or the combustion chamber 170. In some embodiments, each of the spectrometers 135A and 135B may be configured independently to digitize a different portion of the spectrum of light transmitted from the sensor head 155 in order to determine different combustion characteristics.

Figure 4:
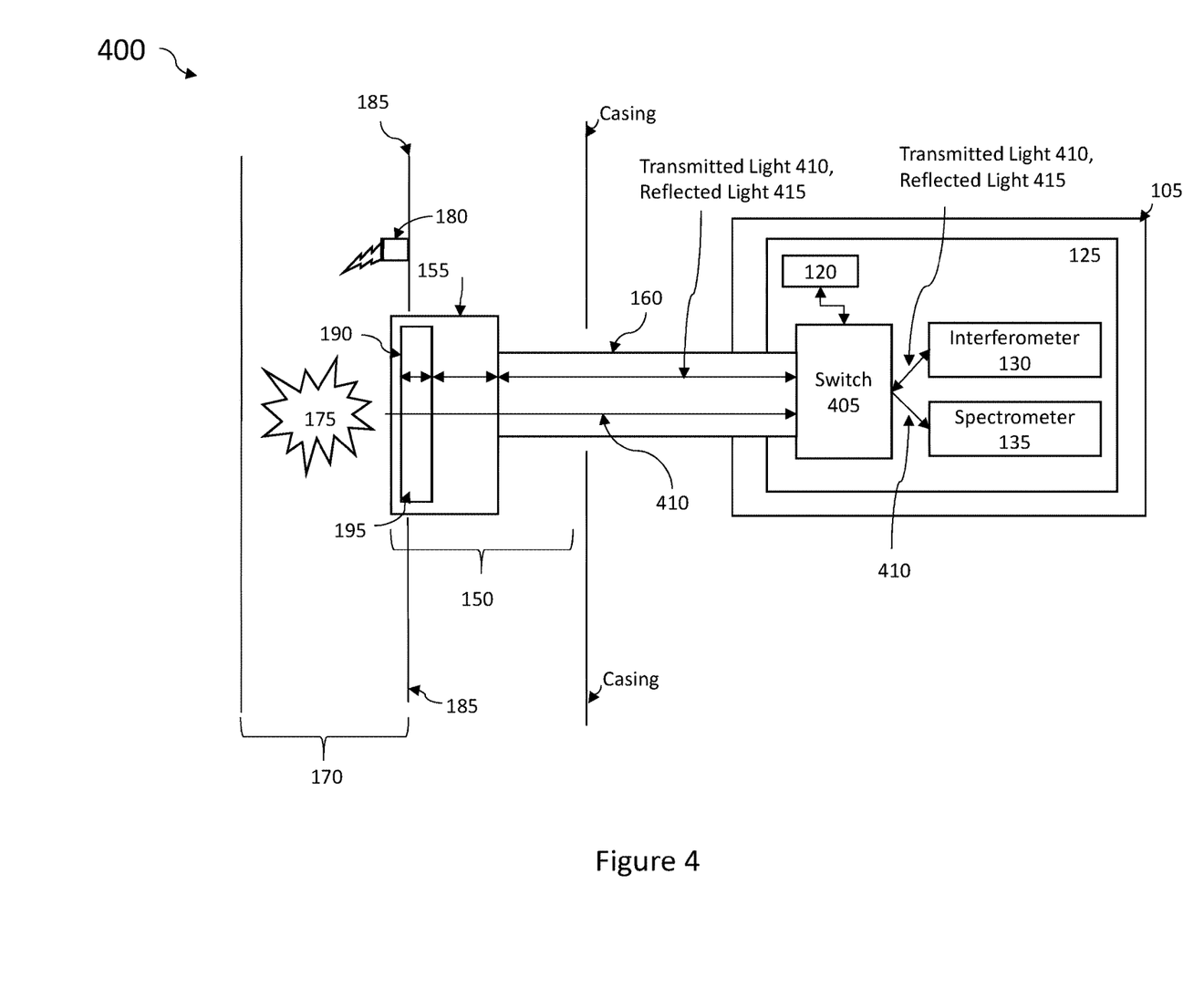
FIG. 4 is a diagram illustrating a different exemplary embodiment of a combustion monitoring system configured to perform combustion monitoring using spectral analysis in operation.

FIG. 4 is a diagram 400 illustrating a different exemplary embodiment of a combustion monitoring system in operation to perform combustion monitoring using spectral analysis. The system shown in FIG. 4 includes similar components as the system 300 of FIG. 3, except that the optical sensor interrogator 125 includes an optical switch 405 that is coupled to a single optical fiber, e.g., optical fiber 160. The optical switch 405 is also coupled to the interferometer 130 and the spectrometer 135 which can operate as described in relation to FIGS. 2 and 3, respectively.

As shown in FIG. 4, transmitted light 410 is received from the sensor head 155 by the optical switch 405 for performing spectral analysis of the combustion chamber reaction. In such an embodiment, the optical sensor interrogator 125 can be coupled to a controller 120, such as a FPGA or microcontroller, which can be coupled to the switch 405. The controller 120 can include or receive executable instructions, which when executed cause the controller 120 to control the optical switch 405 to distribute the transmitted light 410 from the sensor head 155 to the interferometer 130 or the spectrometer 135 as appropriate. Similarly, the controller 120 can receive the light 415 that is generated by the interferometer 130 and transmit that light 415 to the sensor head 155 where it will be reflected at reflection points to create interference patterns, as described in relation to FIG. 2, before being received by the optical switch 405 and transmitted to the interferometer 130 for interferometric analysis.

A benefit to the configuration of the combustion monitoring system 400 shown in FIG. 4, is that the single point of penetration in the combustion chamber liner 185 and casing can be utilized to perform both interferometric and spectral analysis techniques and thereby optimize space constraints within the equipment being monitored. In addition, single penetration sites, and the hardware included therein, which may have been previously used for spectral analysis can be modified or reconfigured with a sensor head assembly 150 and a combustion monitoring system that can be configured for interferometric and spectral analysis.

Figure 5A:
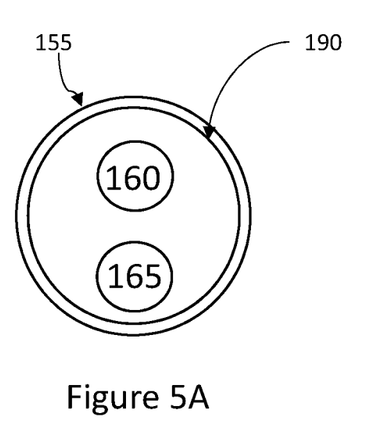
FIGS. 5A-5B are diagrams illustrating exemplary embodiments of a sensor head of the combustion monitoring system of FIG. 1.
Figure 5B:
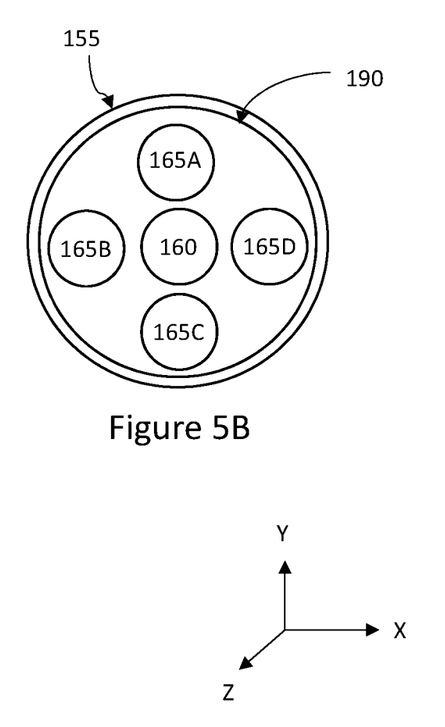

FIGS. 5A-5B are diagrams illustrating exemplary embodiments of a sensor head 155 included in a system configured to perform combustion monitoring using spectral analysis, such as the system 100 shown and described in relation to FIGS. 1-4. FIGS. 5A-5B illustrate two exemplary configurations of the sensor head 155. Each configuration shows the face of the sensor head 155 viewed from the perspective of inside the combustion chamber 170, looking at the face of the sensor head 155 as it would be interfaced with the combustion chamber 170 at its single point of penetration.

As shown in each of FIGS. 5A-5B, the sensor head 155 includes the diaphragm 190 and a plurality of optical fibers, such as optical fiber 160 and optical fiber 165. A variety of diaphragm 190 and vacuum cavity 195 shapes are contemplated in the present disclosure. The diaphragm 190 and corresponding vacuum cavity (not explicitly shown, but which can be interpreted as positioned immediately behind the diaphragm 190) are illustrated showing the diaphragm 190 as a surface which covers the vacuum cavity. In operation, the surface of the diaphragm 190 can deflect into the vacuum cavity (e.g., along a Z-axis or in a direction that corresponds with a direction into or out of the page on which FIGS. 5A-5B are presented) as pressure fluctuations within the combustion chamber 170 occur. Generally the diaphragm 190 shape may correspond to the shape of the vacuum cavity 195, and vice versa. Additionally, as will be described in relation to FIG. 5B, in some embodiments, the sensor head 155 may be configured with a plurality of second optical fibers 165A-D. For example, the sensor head 155 may include multiple optical fiber 165, each coupling the sensor head 155 to one or more spectrometers 130.

As shown in FIG. 5A, a circular-shaped sensor head 155 is illustrated and includes a circular shaped diaphragm 190. The first optical fiber 160 is positioned in relation to the diaphragm 190 and the second optical fiber 165 is positioned independent from the location of the diaphragm 190 (and the vacuum cavity). A variety configurations of the diaphragm 190 (and the vacuum cavity 195) and the optical fibers 160, 165 may be contemplated in the sensor head 155 design. As shown in FIG. 5A, the optical fibers 160, 165 are arranged in a vertical orientation relative to each other. In some embodiments, the diaphragm 190 (and the vacuum cavity 195) and the optical fibers 160, 165 may be arranged in a horizontal orientation relative to each other. In some embodiments, the circular sensor head 155 may be sized include a 0.5" outside diameter. In other embodiments, the outside diameter of the sensor head 155 may be selected from the range of about 0.10" to about 1" (e.g., about 0.10", 0.3", 0.5", 0.75", or 1.0").

As shown in FIG. 5B, a circular-shaped sensor head 155 is illustrated and includes a centrally positioned circular diaphragm 190 with a plurality of second optical fibers 165A-D arranged peripherally around the diaphragm 190 and the first optical fiber 160. For example, optical fibers 165A, 165B, 165C, and 165D are arranged at positions that are 90 degrees from one another around optical fiber 160. A variety of second optical fiber 165 positions may be achieved and are not limited by the positions shown in FIG. 5B. In some embodiments, the sensor head 155 may be configured with one or more second optical fibers 165 (e.g., 1, 2, 3, 4, 5, 6, 7, 8, 9, or 10 second optical fibers 165).

Figure 6:
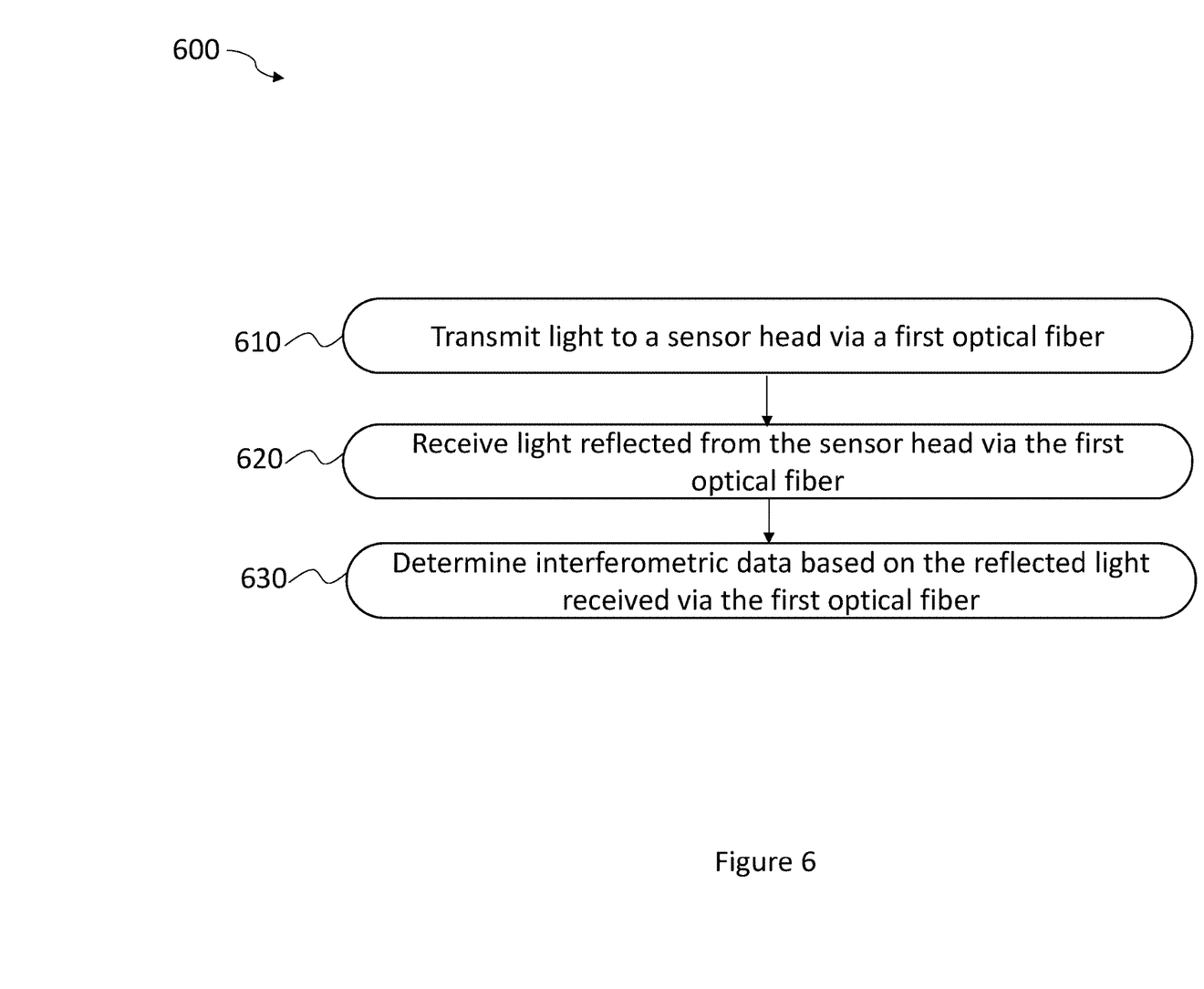
FIG. 6 is a flow diagram illustrating an exemplary embodiment of a method for performing combustion monitoring using interferometric data acquired by the combustion monitoring system of FIG. 1 as described herein.

FIG. 6 illustrates a flow diagram describing one exemplary embodiment of a method 600 for performing combustion monitoring using interferometric data by the combustion monitoring system 100 of FIG. 1 as described herein.

In operation 610, the interferometer 130 transmits light to a sensor head 155 via a first optical fiber 160. The interferometer 130 transmits multi-frequency or white light through the first optical fiber 160 to the sensor head 155.

In operation 620, the interferometer 130 receives light reflected from the sensor head 155 via the first optical fiber 160. The transmitted light passes through the transparent sensor head 155 and is reflected from any number of interfaces or boundaries within the sensor head 155, such as the location where the first optical fiber 160 is interfaced to the sensor head 155 (e.g., reflection point A of FIG. 2), a first vacuum cavity 195 interface (e.g., reflection point B of FIG. 2), and a second vacuum cavity 195 interface located in relation to the diaphragm 190 interface (e.g., reflection point C of FIG. 2).

In operation 630, the interferometer 130 determines interferometric data based on the reflected light received via the first optical fiber 160. The combustion reaction may generate pressure dynamics or variations which cause the diaphragm 190 to deflect such that the transmitted light reflected at the reflection points produces interference patterns which the interferometer 130 may use to determine the distance associated with the deflection. The distances may be further processed by the interferometer 130 to determine the dynamic and static pressure of the combustion reaction. Similarly, the interferometer 130 may determine the temperature of the sensor head 155 by measuring changes in distances between the reflection points due to heat that is absorbed by the sensor head 155. The changes in distances will create interference patterns that can be analyzed using interferometric techniques to determine the sensor head temperature. Sensor head temperature can thus be derived from the changes in distance using coefficients of thermal expansion. The interferometric data can be provided. For example, the interferometric data can be provided to the computing device 105, stored in a memory 115 of the computing device, and/or provided via an output device 145 coupled to the computing device 105, such as a display.

Figure 7:
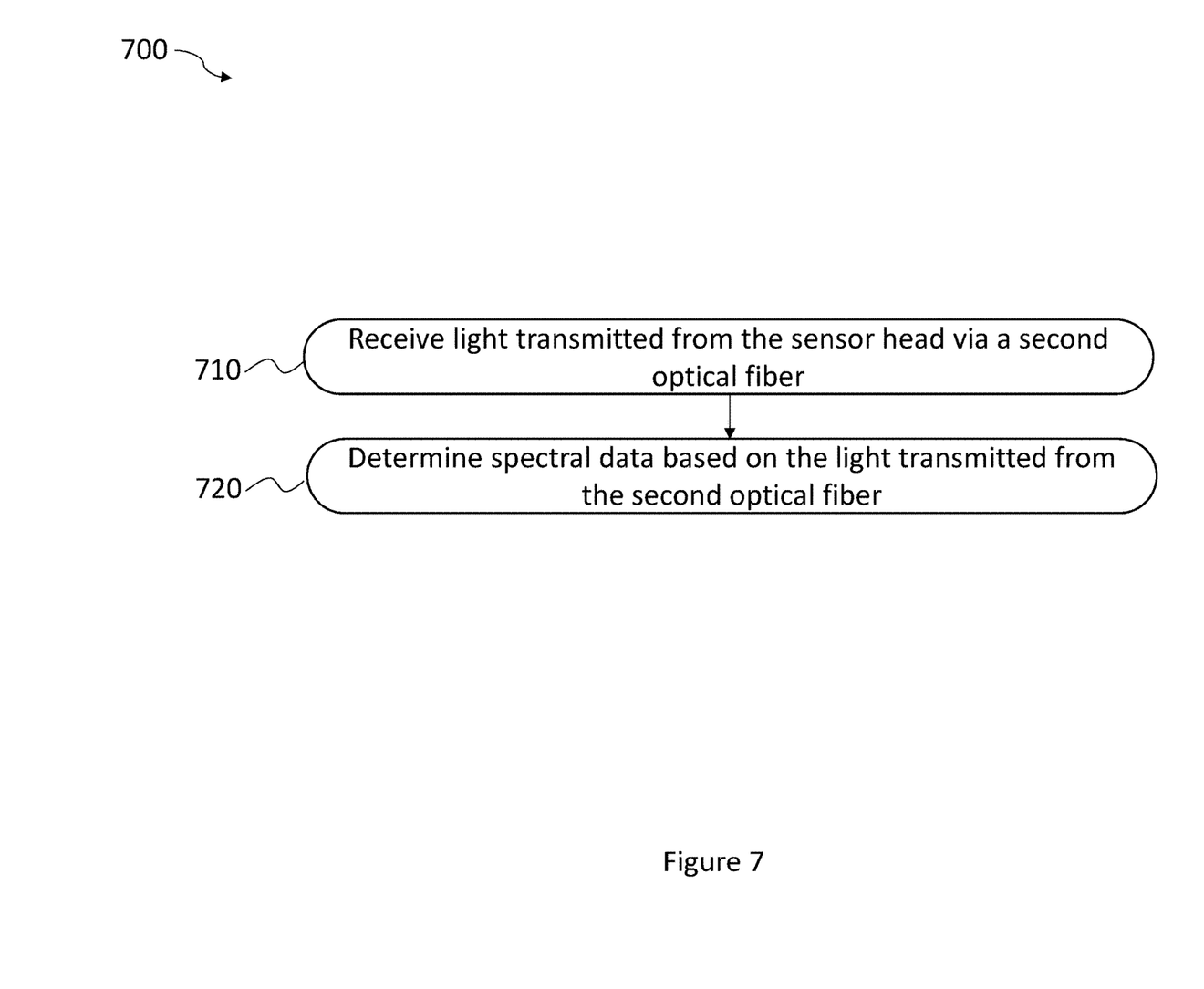
FIG. 7 is a flow diagram illustrating an exemplary embodiment of a method for performing combustion monitoring using spectral data acquired by the combustion monitoring system of FIG. 1 as described herein.

FIG. 7 illustrates a flow diagram describing one exemplary embodiment of a method 700 for performing combustion monitoring using spectral data by the combustion monitoring system 100 of FIG. 1 as described herein.

In operation 710, the spectrometer 135 receives light from the sensor head 155 via a second optical fiber 165. As the combustion reaction occurs in the combustion chamber 170, light is radiated into the second optical fiber 165 and transmitted to the spectrometer 135 where it is received for spectral analysis. The received light includes ultraviolet, visible, and infrared light that is generated by the combustion reaction.

In operation 720, the spectrometer 130 determines spectral data based on the light transmitted from the second optical fiber 165. The light received in operation 710 is digitized by the spectrometer 135 and the spectral signatures of the received light are used to determine characteristics of the combustion reaction. The spectral data can be used to determine combustion characteristics such as flame supervision, igniter supervision, flame temperature, contaminants that may be present in fuel or in the combustion chamber, and flame quality.

Determining flame supervision may include processing the received ultraviolet light to determine the presence or absence of a flame (e.g., an "on/off" indication), as well as determining the intensity of a flame. In some embodiments, threshold values may be used to determine the presence or absence of a flame or levels of flame intensity.

Determining igniter supervision may include processing received ultraviolet and/or visible light to determine the presence and/or absence (e.g., an "on/off" indication) of a spark from an igniter 180 of the combustion chamber 170, as well as determining the intensity of the spark on the igniter 180. In some embodiments, threshold values may be used to determine the presence or absence of the igniter spark or levels of igniter spark intensity.

Determining flame temperature may include analyzing wavelength ranges of the received light over time and determining a corresponding trend in temperature associated with the time-series of wavelength data.

Determining the presence of contaminants in the fuel or within the combustion chamber 170 may include analyzing visible and infrared light for peaks in the spectral signatures that may correspond to particular contaminants. For example, sulfur, chlorine, nickel, sodium, vanadium, or other elemental contaminants, may generate unique spectral signatures in visible and infrared light as they are combusted in the combustion reaction.

Determining flame quality may include analyzing received ultraviolet and infrared light to determine if the flame or combustion reaction is efficient or inefficient. Flame quality may be determined as a ratio of two wavelength ranges.

In some embodiments, the spectral data can be provided to the computing device 105, stored in a memory 115 of the computing device 105, and/or provided via an output device 145 coupled to the computing device 105, such as a display.

In some embodiments, additional spectral measurements may be determined using additional or alternative spectral analysis techniques to those described above.

Exemplary technical effects of the systems, devices, and methods described herein include, by way of non-limiting example, enhanced combustion monitoring of a combustion reaction in a combustion chamber using a single penetration site. In one aspect, the combustion monitoring is performed using a sensor head disposed within the single penetration site such that a plurality of optical fibers can be integrated with the sensor head to measure interferometric and spectral data generated by the combustion reaction. In another aspect, the sensor head is coupled to an interrogator configured to process the interferometric and spectral data in a single computing device. In this manner, a broad range of combustion characteristics can be achieved via a sensor head positioned in a single point of penetration within a combustion chamber to provide a more robust combustion monitoring system.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, such as display 150, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Certain exemplary embodiments are described to provide an overview of the principles of the structure, function, manufacture, and use of the systems, devices, and methods disclosed herein. One or more examples of these embodiments are illustrated in the accompanying drawings. The features illustrated or described in connection with one exemplary embodiment can be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A combustion monitoring system comprising:
a computing device, including a data processor;
a sensor head assembly including a sensor head affixed to a combustion chamber, the sensor head comprising:
a first sized vacuum cavity located in a first position within the sensor head, and
a diaphragm including a first surface positioned opposite the first sized vacuum cavity and a second surface operatively interfaced to an inner portion of the combustion chamber,
wherein the sensor head is configured to measure combustion conditions of a flame in the combustion chamber based on light transmitted via optical fibers; and
an optical sensor interrogator configured on the computing device and coupled to the sensor head via a plurality of optical fibers, the optical sensor interrogator including:
an interferometer coupled to the sensor head and configured to determine interferometric data associated with the flame based on the light transmitted to and reflected from the sensor head via a first optical fiber, the interferometer further including a Fizeau wedge projecting an interference pattern associated with the reflected light onto a charge-coupled device in order to determine one or more combustion characteristics based on the interferometric data;
a first spectrometer coupled to the sensor head and configured to:
digitize a first portion of a spectrum of light, and
determine spectral data associated with the flame based on the digitized first portion; and
a second spectrometer coupled to the sensor head and configured to:
digitize a second portion of the spectrum of the light, and
determine additional spectral data associated with the flame based on the digitized second portion.

2. The combustion monitoring system of claim 1, wherein the optical sensor interrogator is coupled to the sensor head via a single optical fiber, and further includes an optical switch coupled to the interferometer and to the first spectrometer.

3. The combustion monitoring system of claim 1, wherein the computing device is configured to execute instructions causing the data processor to determine the interferometric data and/or the spectral data based on a pre-determined start time, a pre-determined event, or a predetermined interval of time since the instructions were previously executed.

4. The combustion monitoring system of claim 1, wherein the sensor head is affixed to the combustion chamber at a single penetration point.

5. The combustion monitoring system of claim 1, wherein the sensor head is formed of sapphire or aluminum oxide.

6. The combustion monitoring system of claim 1, wherein at least one optical fiber of the plurality of optical fibers includes a single strand optical fiber or multi-strand optical fiber.

7. The combustion monitoring system of claim 1, wherein the optical sensor interrogator includes the second spectrometer coupled to the sensor head via a third optical fiber.

8. The combustion monitoring system of claim 1, wherein a second optical fiber is configured within the sensor head in a horizontal orientation relative the first optical fiber.

9. The combustion monitoring system of claim 1, wherein a second optical fiber is configured within the sensor head in a vertical orientation relative the first optical fiber.

10. The combustion monitoring system of claim 1, wherein the first optical fiber is configured centrally within the sensor head and a plurality of second optical fibers are configured radially within the sensor head relative to the centrally configured first optical fiber.

11. A method comprising:
transmitting light to a sensor head via a first optical fiber, the sensor head affixed to a combustion chamber and configured to measure combustion conditions of a flame in the combustion chamber based on the transmitted light;
receiving light reflected from the sensor head via the first optical fiber;
determining interferometric data based on the reflected light received via the first optical fiber, the determining further comprising
projecting, using an interferometer, an interference pattern associated with the reflected light, the interferometer further including a Fizeau wedge projecting an interference pattern associated with the reflected light onto a charge-coupled device in order to determine one or more combustion characteristics based on the interferometric data;
providing the interferometric data;
digitizing a first portion of a spectrum of the light associated with the flame;
determining spectral data associated with the flame based on the digitized first portion;
digitizing a second portion of the spectrum of the light, and
determining additional spectral data associated with the flame based on the digitized second portion.

12. The method of claim 11, further comprising determining a dynamic pressure and/or a static pressure of a combustion reaction occurring within the combustion chamber based on the determined interferometric data.

13. The method of claim 11, wherein determining the interferometric data further includes determining a sensor head temperature based on the determined interferometric data.

14. The method of claim 11, further comprising
receiving light transmitted from the sensor head via a second optical fiber;
determining spectral data based on the light transmitted from the second optical fiber; and
providing the spectral data.

15. The method of claim 11, wherein the sensor head is affixed to the combustion chamber at a single penetration point.

16. The method of claim 11, wherein the sensor head is formed of sapphire or aluminum oxide.

17. The method of claim 14, further comprising determining one or more of a flame temperature, a flame quality, a presence of a contaminant, an absence of a contaminant, a measure of flame supervision, a measure of igniter supervision, or any combination thereof, based on the determined spectral data and the determined additional spectral data.

18. The method of claim 17, wherein the contaminant includes chlorine, nickel, vanadium, potassium, sodium, sulfur, and/or a combination thereof.

19. The method of claim 17, wherein the flame quality is determined as a ratio of two wavelength ranges.

20. A non-transitory machine readable storage medium comprising program instructions, which when executed, cause one or more data processors to perform operations comprising:
transmitting light to a sensor head via a first optical fiber, the sensor head affixed to a combustion chamber and configured to measure combustion conditions of a flame in the combustion chamber based on the transmitted light;
receiving light reflected from the sensor head via the first optical fiber;
determining interferometric data based on the reflected light received via the first optical fiber, the determining further comprising
projecting, using an interferometer, an interference pattern associated with the reflected light, the interferometer further including a Fizeau wedge projecting an interference pattern associated with the reflected light onto a charge-coupled device in order to determine one or more combustion characteristics based on the interferometric data;
providing the interferometric data;
digitizing a first portion of a spectrum of the light associated with the flame;
determining spectral data associated with the flame based on the digitized first portion;
digitizing a second portion of the spectrum of the light, and
determining additional spectral data associated with the flame based on the digitized second portion.

* * * * *